US012718134B2

(12) United States Patent
Woerner et al.

(10) Patent No.: US 12,718,134 B2
(45) Date of Patent: Aug. 25, 2026

(54) GENERATING OPTIMAL SAMPLES IN QUANTUM OPTIMIZATION ALGORITHMS

(71) Applicant: International Business Machines Corporation, Armonk, NY (US)

(72) Inventors: Stefan Woerner, Zürich (CH); Daniel Josef Egger, Zürich (CH)

(73) Assignee: International Business Machines Corporation, Armonk, NY (US)

(*) Notice: Subject to any disclaimer, the term of this patent is extended or adjusted under 35 U.S.C. 154(b) by 27 days.

(21) Appl. No.: 18/222,651

(22) Filed: Jul. 17, 2023

(65) Prior Publication Data

US 2025/0028991 A1 Jan. 23, 2025

(51) Int. Cl.
*G06N 10/70* (2022.01)
*G06N 10/60* (2022.01)

(52) U.S. Cl.
CPC ............. *G06N 10/70* (2022.01); *G06N 10/60* (2022.01)

(58) Field of Classification Search
CPC ...................................................... G06N 10/70
See application file for complete search history.

(56) References Cited

U.S. PATENT DOCUMENTS 10,622,978 B1 * 4/2020 Debnath .................. H03K 3/38
10,643,143 B2 * 5/2020 Bloom ................. H03K 19/195
11,468,289 B2 * 10/2022 Cao ........................ G06N 3/044
11,928,004 B2 * 3/2024 Earnest-Noble ....... G06N 10/70
11,966,707 B2 * 4/2024 Cao ......................... G06F 40/40
12,067,458 B2 * 8/2024 Gonthier ................. G06F 15/16
12,093,128 B2 * 9/2024 Niroula ................... G06F 11/10
2023/0196172 A1 * 6/2023 Paetznick .............. G06N 10/70
702/191

OTHER PUBLICATIONS

Piveteau et al., "Quasiprobability Decompositions with Reduced Sampling Overhead," npj Quantum Information, vol. 8, Article 12, 2022, pp. 1-9.
Temme et al., "Error Mitigation for Short-Depth Quantum Circuits," arXiv:1612.02058v3, Nov. 6, 2017, pp. 1-15.
Van Den Berg et al., "Probabilistic Error Cancellation with Sparse Pauli-Lindblad Models on Noisy Quantum Processors," arXiv:2201.09866v2, Jun. 23, 2022, pp. 1-29.

* cited by examiner

*Primary Examiner* — Esaw T Abraham
(74) *Attorney, Agent, or Firm* — Shackelford, Mckinley & Norton, LLP; Robert A. Voigt, Jr.

(57) ABSTRACT

A method, system and computer program product for generating optimal samples in quantum optimization algorithms. A quantum error mitigation technique is used to generate samples of a resulting probability distribution from random quantum circuits. Examples of such quantum error mitigation techniques include probabilistic error cancellation (PEC) and zero noise extrapolation (ZNE). An objective ($f(x)$) for every generated sample ($|x\rangle$) is then computed. A conditional value at risk (CVaR) at a particular level of the computed objective functions corresponding to an optimal sample in a quantum optimization algorithm, such as a variational quantum optimization algorithm, is then computed. In this manner, optimal samples in quantum optimization algorithms are generated using quantum error mitigation techniques, such as probabilistic error cancellation and zero noise extrapolation.

20 Claims, 5 Drawing Sheets

GENERATING OPTIMAL SAMPLES IN QUANTUM OPTIMIZATION ALGORITHMS

TECHNICAL FIELD

The present disclosure relates generally to quantum optimization algorithms, and more particularly to generating optimal samples in quantum optimization algorithms.

BACKGROUND

Current quantum hardware is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty estimates. Fortunately, quantum error mitigation provides a collection of tools and methods that allow one to evaluate accurate expectation values (probabilistic expected values of the quantum circuit) from noisy, shallow depth quantum circuits, even before the introduction of fault tolerance.

Quantum error mitigation refers to a series of techniques aimed at reducing (mitigating) the errors that occur in quantum computing algorithms. Examples of such quantum error mitigation techniques include probabilistic error cancellation (PEC) and zero noise extrapolation (ZNE). PEC is a quantum error mitigation technique in which ideal operations are represented as linear combinations of noisy operations. In PEC, unbiased estimates of expectation values are obtained by averaging over different noisy circuits. ZNE is a quantum error mitigation technique in which an expectation value is computed at different noise levels, and, as a second step, the ideal expectation value is inferred by extrapolating the measured results to the zero-noise limit.

Hence, such quantum error mitigation techniques produce unbiased estimations of expectation values. However, the goal of many quantum optimization algorithms (quantum algorithms that are used to solve optimization problems, which are problems of finding the best solution from all feasible solutions) is to find a single sample $|x\rangle$ that has a certain property that can be validated efficiently classically. For example, a sample may correspond to a solution of an optimization problem or an input to a black box function that produces a particular output value. Such quantum optimization algorithms are designed to maximize the probability of identifying such a sample $|x\rangle$. Examples of such quantum optimization algorithms include the Quantum Approximate Optimization Algorithm (QAOA) and Grover's Algorithm.

For such quantum optimization algorithms, the goal is to find $\theta^*$ that minimizes $<\psi(\theta)|H|\psi(\theta)>$, and then generate samples $|x\rangle$ from $\psi(\theta)$ that minimize $f(x)$, where $\psi(\theta)$ corresponds to the parametrized state, $f(x)$ corresponds to the objective function and H corresponds to the Hamiltonian (cost function Hamiltonian).

Unfortunately, techniques for assisting quantum optimization algorithms to find a single sample $|x\rangle$ that has a certain property that can be validated efficiently classically is limited. For example, error mitigation techniques, such as the quantum error mitigation techniques discussed above, can only be utilized for parameter optimization for quantum optimization algorithms since these quantum error mitigation techniques error mitigate expectation values and not samples. Such quantum error mitigation techniques cannot currently be utilized to generate optimal (best or most favorable) samples $|x\rangle$ in a quantum optimization algorithm.

SUMMARY

In one embodiment of the present disclosure, a method for generating optimal samples in quantum optimization algorithms comprises implementing a quantum error mitigation technique to generate samples of a resulting probability distribution from random quantum circuits. The method further comprises computing an objective function for every generated sample. The method additionally comprises computing a conditional value at risk at a particular level of the computed objective functions corresponding to an optimal sample in a quantum optimization algorithm.

Additionally, in one embodiment of the present disclosure, the computing of the conditional value at risk comprises computing an average of the computed objective functions at the particular level of the computed objective functions.

Furthermore, in one embodiment of the present disclosure, the average comprises a weighted average.

Additionally, in one embodiment of the present disclosure, the samples correspond to solutions of an optimization problem.

Furthermore, in one embodiment of the present disclosure, the samples correspond to inputs to a black box function that produce a particular output value.

Additionally, in one embodiment of the present disclosure, the quantum optimization algorithm corresponds to a variational quantum optimization algorithm, where optimization of parameters of the variational quantum optimization algorithm is performed using the quantum error mitigation technique acting on an expectation value or on the samples.

Furthermore, in one embodiment of the present disclosure, the samples are generated from the random quantum circuits in which quantum gates have been inserted to probabilistically cancel errors.

Other forms of the embodiments of the method described above are in a system and in a computer program product.

Accordingly, embodiments of the present disclosure provide the means for generating optimal samples in quantum optimization algorithms using error mitigation techniques, such as probabilistic error cancellation and zero noise extrapolation.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
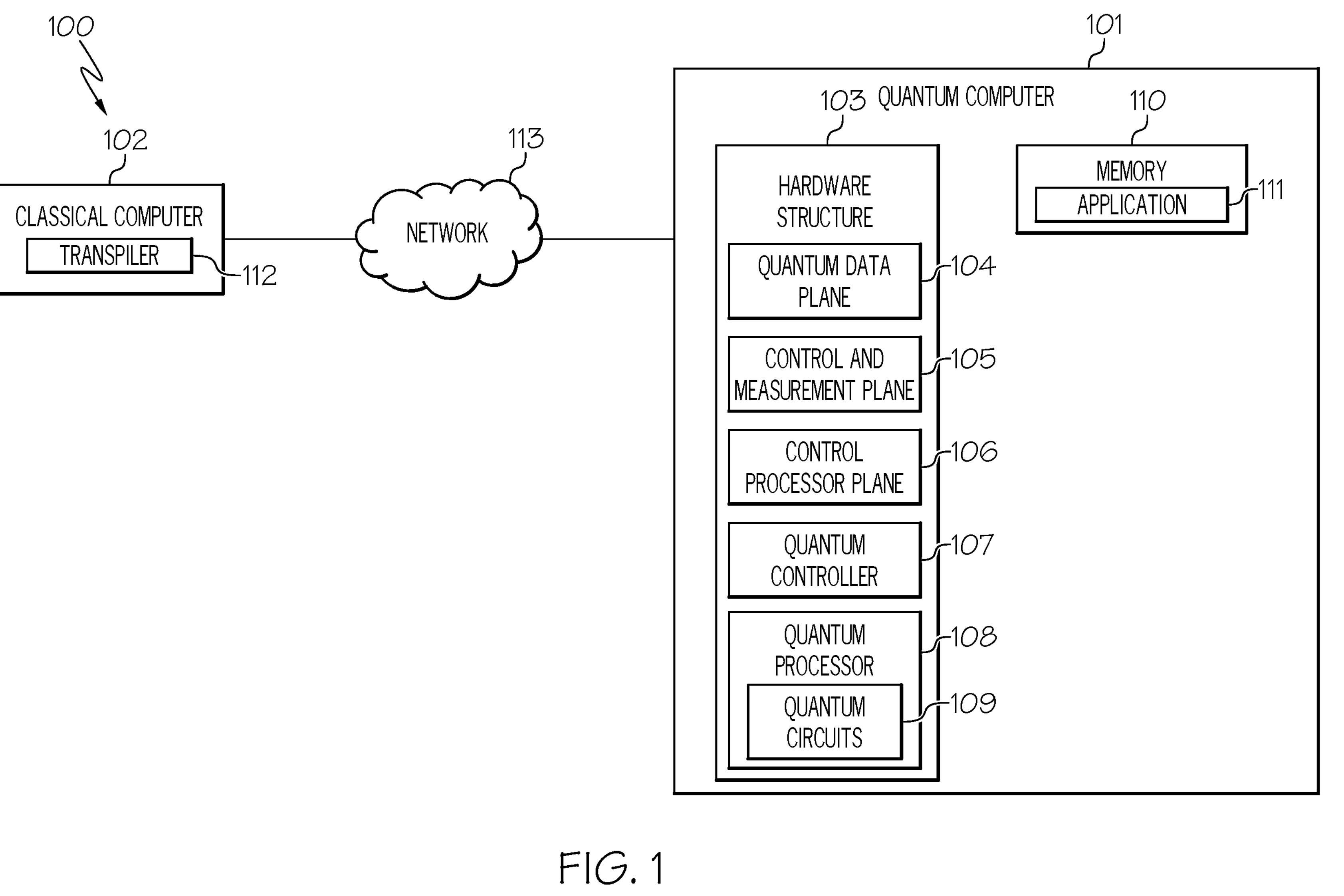
FIG. 1 illustrates a communication system for practicing the principles of the present disclosure in accordance with an embodiment of the present disclosure.

In one embodiment of the present disclosure, a method for generating optimal samples in quantum optimization algorithms comprises implementing a quantum error mitigation technique to generate samples of a resulting probability distribution from random quantum circuits. The method further comprises computing an objective function for every generated sample. The method additionally comprises computing a conditional value at risk at a particular level of the computed objective functions corresponding to an optimal sample in a quantum optimization algorithm.

In this manner, optimal samples in quantum optimization algorithms are generated using quantum error mitigation techniques, such as probabilistic error cancellation and zero noise extrapolation. "Optimal samples," as used herein, refer to samples that have an approximation ratio approximately equal to the value of 1, where the approximation ratio is a ratio between the result obtained by the algorithm and the optimal cost and where the approximation ratio is a number between 0 and 1.

Additionally, in one embodiment of the present disclosure, the computing of the conditional value at risk comprises computing an average of the computed objective functions at the particular level of the computed objective functions.

In this manner, the conditional value at risk is computed by computing an average of the objective functions at a particular level of the computed objective functions.

Furthermore, in one embodiment of the present disclosure, the average comprises a weighted average.

In this manner, the computed average of the objective functions corresponds to a weighted average.

Additionally, in one embodiment of the present disclosure, the samples correspond to solutions of an optimization problem.

In this manner, the generated samples correspond to solutions of an optimization problem.

Furthermore, in one embodiment of the present disclosure, the samples correspond to inputs to a black box function that produce a particular output value.

In this manner, the generated samples correspond to inputs to a black box function that produce a particular output value.

Additionally, in one embodiment of the present disclosure, the quantum optimization algorithm corresponds to a variational quantum optimization algorithm, where optimization of parameters of the variational quantum optimization algorithm is performed using the quantum error mitigation technique acting on an expectation value or on the samples.

In this manner, the quantum optimization algorithm corresponds to a variational quantum optimization algorithm in which the parameters of the variational quantum optimization algorithm are optimized using the quantum error mitigation technique acting on an expectation value or on the samples.

Furthermore, in one embodiment of the present disclosure, the samples are generated from the random quantum circuits in which quantum gates have been inserted to probabilistically cancel errors.

In this manner, the samples are generated from random quantum circuit in which quantum gates are inserted to probabilistically cancel errors.

Other forms of the embodiments of the method described above are in a system and in a computer program product.

As stated in the Background section, quantum error mitigation refers to a series of techniques aimed at reducing (mitigating) the errors that occur in quantum computing algorithms. Examples of such quantum error mitigation techniques include probabilistic error cancellation (PEC) and zero noise extrapolation (ZNE). PEC is a quantum error mitigation technique in which ideal operations are represented as linear combinations of noisy operations. In PEC, unbiased estimates of expectation values are obtained by averaging over different noisy circuits. ZNE is a quantum error mitigation technique in which an expectation value is computed at different noise levels, and, as a second step, the ideal expectation value is inferred by extrapolating the measured results to the zero-noise limit.

Hence, such quantum error mitigation techniques produce unbiased estimations of expectation values. However, the goal of many quantum optimization algorithms (quantum algorithms that are used to solve optimization problems, which are problems of finding the best solution from all feasible solutions) is to find a single sample $|x\rangle$ that has a certain property that can be validated efficiently classically. For example, a sample may correspond to a solution of an optimization problem or an input to a black box function that produces a particular output value. Such quantum optimization algorithms are designed to maximize the probability of identifying such a sample $|x\rangle$. Examples of such quantum optimization algorithms include the Quantum Approximate Optimization Algorithm (QAOA) and Grover's Algorithm.

For such quantum optimization algorithms, the goal is to find $\theta^*$ that minimizes $<\psi(\theta)|H|\psi(\theta)>$, and then generate samples $|x\rangle$ from $\psi(\theta)$ that minimize $f(x)$, where $\psi(\theta)$ corresponds to the parametrized state, $f(x)$ corresponds to the objective function and H corresponds to the Hamiltonian (cost function Hamiltonian).

Unfortunately, techniques for assisting quantum optimization algorithms to find a single sample $|x\rangle$ that has a certain property that can be validated efficiently classically is limited. For example, error mitigation techniques, such as the quantum error mitigation techniques discussed above, can only be utilized for parameter optimization for quantum optimization algorithms since these quantum error mitigation techniques error mitigate expectation values and not samples. Such quantum error mitigation techniques cannot currently be utilized to generate optimal (best or most favorable) samples $|x\rangle$ in a quantum optimization algorithm.

The embodiments of the present disclosure provide the means for generating optimal samples in quantum optimization algorithms using quantum error mitigation techniques, such as PEC and ZNE. In one embodiment, such a quantum error mitigation technique is implemented to generate samples of a resulting probability distribution from random quantum circuits. A random quantum circuit, as used herein, refers to a quantum circuit with randomness in the circuit elements. An objective function ($f(x)$) may then be computed for every generated sample ($|x\rangle$). A conditional value at risk may then be computed at a particular level of the computed objective functions corresponding to an optimal sample in a quantum optimization algorithm. In this manner, an optimal sample in a quantum optimization algorithm may be generated by using quantum error mitigation techniques. These and other features will be discussed in further detail below.

In some embodiments of the present disclosure, the present disclosure comprises a method, system and computer program product for generating optimal samples in quantum optimization algorithms. In one embodiment of the present disclosure, a quantum error mitigation technique is used to generate samples of a resulting probability distribution from random quantum circuits. Examples of such quantum error mitigation techniques include probabilistic error cancellation (PEC) and zero noise extrapolation (ZNE). In one embodiment, such samples correspond to solutions of an optimization problem. In one embodiment, such samples correspond to inputs to a black box function that produce a particular output value. An objective ($f(x)$) for every generated sample ($|x\rangle$) is then computed. A conditional value at risk (CVaR) at a particular level of the computed objective functions corresponding to an optimal sample in a quantum optimization algorithm, such as a variational quantum optimization algorithm, is then computed. A variational quantum optimization algorithm, as used herein, refers to a hybrid quantum-classical optimization algorithm in which an objective function (usually encoded by a parameterized quantum circuit) is evaluated by quantum computation and the parameters of this function are updated using classical optimization methods. In one embodiment, the computation of the CVaR involves computing an average, such as a weighted average, of the computed objective functions at the particular level of the computed objective functions. In this manner, optimal samples in quantum optimization algorithms are generated using quantum error mitigation techniques, such as probabilistic error cancellation and zero noise extrapolation. "Optimal samples," as used herein, refer to samples that have an approximation ratio approximately equal to the value of 1, where the approximation ratio is a ratio between the result obtained by the algorithm and the optimal cost and where the approximation ratio is a number between 0 and 1.

By implementing the protocol of the present disclosure, a cubic speed-up over standard PEC/ZNE can be achieved. As a result, less classical computation is required for a similar accuracy of quantum computation thereby reducing time and resources needed for performing quantum error correction techniques.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes a quantum computer 101 configured to perform quantum computations, such as the types of computations that harness the collective properties of quantum states, such as superposition, interference, and entanglement, as well as a classical computer 102 in which information is stored in bits that are represented logically by either a 0 (off) or a 1 (on). Examples of classical computer 102 include, but not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, and the like configured with the capability of connecting to network 113 (discussed below).

In one embodiment, classical computer 102 is used to setup the state of quantum bits in quantum computer 101 and then quantum computer 101 starts the quantum process. Furthermore, in one embodiment, classical computer 102 is configured to generate optimal samples in quantum optimization algorithms using quantum error mitigation techniques as discussed further below.

In one embodiment, a hardware structure 103 of quantum computer 101 includes a quantum data plane 104, a control and measurement plane 105, a control processor plane 106, a quantum controller 107 and a quantum processor 108. While depicted as being located on a single machine, quantum data plane 104, control and measurement plane 105, and control processor plane 106 may be distributed across multiple computing machines, such as in a cloud computing architecture, and communicate with quantum controller 107, which may be located in close proximity to quantum processor 108.

Quantum data plane 104 includes the physical qubits or quantum bits (basic unit of quantum information in which a qubit is a two-state (or two-level) quantum-mechanical system) and the structures needed to hold them in place. In one embodiment, quantum data plane 104 contains any support circuitry needed to measure the qubits' state and perform gate operations on the physical qubits for a gate-based system or control the Hamiltonian for an analog computer. In one embodiment, control signals routed to the selected qubit(s) set a state of the Hamiltonian. For gate-based systems, since some qubit operations require two qubits, quantum data plane 104 provides a programmable "wiring" network that enables two or more qubits to interact.

Control and measurement plane 105 converts the digital signals of quantum controller 107, which indicates what quantum operations are to be performed, to the analog control signals needed to perform the operations on the qubits in quantum data plane 104. In one embodiment, control and measurement plane 105 converts the analog output of the measurements of qubits in quantum data plane 104 to classical binary data that quantum controller 107 can handle.

Control processor plane 106 identifies and triggers the sequence of quantum gate operations and measurements (which are subsequently carried out by control and measurement plane 105 on quantum data plane 104). These sequences execute the program, provided by quantum processor 108, for implementing a quantum algorithm.

In one embodiment, control processor plane 106 runs the quantum error correction algorithm (if quantum computer 101 is error corrected).

In one embodiment, quantum processor 108 uses qubits to perform computational tasks. In the particular realms where quantum mechanics operate, particles of matter can exist in multiple states, such as an "on" state, an "off" state, and both "on" and "off" states simultaneously. Quantum processor 108 harnesses these quantum states of matter to output signals that are usable in data computing.

In one embodiment, quantum processor 108 performs algorithms which conventional processors are incapable of performing efficiently.

In one embodiment, quantum processor 108 includes one or more quantum circuits 109. Quantum circuits 109 may collectively or individually be referred to as quantum circuits 109 or quantum circuit 109, respectively. A "quantum circuit 109," as used herein, refers to a model for quantum computation in which a computation is a sequence of quantum logic gates, measurements, initializations of qubits to known values and possibly other actions. A "quantum logic gate," as used herein, is a reversible unitary transformation on at least one qubit. Quantum logic gates, in contrast to classical logic gate, are all reversible. Examples of quantum logic gates include RX (performs $e^{-i\theta X/2}$, which corresponds to a rotation of the qubit state around the X-axis by the given angle theta θ on the Bloch sphere), RY (performs $e^{-i\theta Y/2}$, which corresponds to a rotation of the qubit state around the Y-axis by the given angle theta θ on the Bloch sphere), RXX (performs the operation $e^{(-i\theta X \otimes X/2)}$ on the input qubit), RZZ (takes in one input, an angle theta θ expressed in radians, and it acts on two qubits), etc. In one embodiment, quantum circuits 109 are written such that the horizontal axis is time, starting at the left hand side and ending at the right hand side.

Furthermore, in one embodiment, quantum circuit 109 corresponds to a command structure provided to control processor plane 106 on how to operate control and measurement plane 105 to run the algorithm on quantum data plane 104/quantum processor 108.

Furthermore, quantum computer 101 includes memory 110, which may correspond to quantum memory. In one embodiment, memory 110 is a set of quantum bits that store quantum states for later retrieval. The state stored in quantum memory 110 can retain quantum superposition.

In one embodiment, memory 110 stores an application 111 that may be configured to implement one or more of the methods described herein in accordance with one or more embodiments. For example, application 111 may implement a program for generating optimal samples in quantum optimization algorithms using quantum error mitigation techniques as discussed further below in connection with FIGS. 2 and 4. Examples of memory 110 include light quantum memory, solid quantum memory, gradient echo memory, electromagnetically induced transparency, etc.

Furthermore, in one embodiment, classical computer 102 includes a "transpiler 112," which as used herein, is configured to rewrite an abstract quantum circuit 109 into a functionally equivalent one that matches the constraints and characteristics of a specific target quantum device. In one embodiment, transpiler 112 (e.g., qiskit.transpiler, where Qiskit® is an open-source software development kit for working with quantum computers at the level of circuits, pulses, and algorithms) converts the trained machine learning model upon execution on quantum hardware 103 to its elementary instructions and maps it to physical qubits.

In one embodiment, quantum machine learning models are based on variational quantum circuits 109. Such models consist of data encoding, processing parameterized with trainable parameters, and measurement/post-processing.

In one embodiment, the number of qubits (basic unit of quantum information in which a qubit is a two-state (or two-level) quantum-mechanical system) is determined by the number of features in the data. This processing stage may include multiple layers of parameterized gates. As a result, in one embodiment, the number of trainable parameters is (number of features)*(number of layers).

Furthermore, as shown in FIG. 1, classical computer 102, which is used to setup the state of quantum bits in quantum computer 101, may be connected to quantum computer 101 via a network 113.

Network 113 may be, for example, a quantum network, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, a cellular network and various combinations thereof, etc. Other networks, whose descriptions are omitted here for brevity, may also be used in conjunction with system 100 of FIG. 1 without departing from the scope of the present disclosure.

Furthermore, classical computer 102 is configured to generate optimal samples in quantum optimization algorithms using quantum error mitigation techniques as discussed further below in connection with FIGS. 2-3 and 5. A description of the software components of classical computer 102 is provided below in connection with FIG. 2 and a description of the hardware configuration of classical computer 102 is provided further below in connection with FIG. 4.

System 100 is not to be limited in scope to any one particular network architecture. System 100 may include any number of quantum computers 101, classical computers 102 and networks 113.

A discussion regarding the software components used by classical computer 102 for generating optimal samples in quantum optimization algorithms using quantum error mitigation techniques is provided below in connection with FIG. 2.

Figure 2:
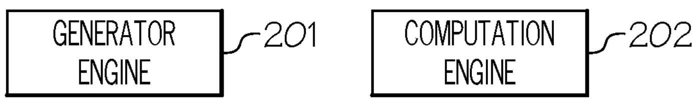
FIG. 2 is a diagram of the software components of the classical system for generating optimal samples in quantum optimization algorithms using quantum error mitigation techniques in accordance with an embodiment of the present disclosure.

FIG. 2 is a diagram of the software components of classical system 102 (FIG. 1) for generating optimal samples in quantum optimization algorithms using quantum error mitigation techniques in accordance with an embodiment of the present disclosure.

Referring to FIG. 2, in conjunction with FIG. 1, classical computer 102 includes a generator engine 201 configured to implement a quantum error mitigation technique to generate samples of a resulting probability distribution from random quantum circuits. In one embodiment, such samples correspond to solutions of an optimization problem. In one embodiment, such samples correspond to inputs to a black box function that produce a particular output value.

In one embodiment, the samples are generated from the random quantum circuits in which quantum gates have been inserted to probabilistically cancel errors.

As discussed above, quantum error mitigation refers to a series of techniques aimed at reducing (mitigating) the errors that occur in quantum computing algorithms. Examples of such quantum error mitigation techniques include probabilistic error cancellation (PEC) and zero noise extrapolation (ZNE). PEC is a quantum error mitigation technique in which ideal operations are represented as linear combinations of noisy operations. In PEC, unbiased estimates of expectation values are obtained by averaging over different noisy circuits. ZNE is a quantum error mitigation technique in which an expectation value is computed at different noise levels, and, as a second step, the ideal expectation value is inferred by extrapolating the measured results to the zero-noise limit.

A random quantum circuit, as used herein, refers to a quantum circuit with randomness in the circuit elements. In one embodiment, such a random quantum circuit includes a subset of noisy gates that are twirled with Pauli operators. The twirling inserts random Pauli operators in the quantum circuit such that the twirled circuit is logically equivalent to the original quantum circuit. The twirling reduces all the noise in the noisy quantum gates to Pauli noise. Furthermore, a noise model is learnt for the twirled gates in the quantum circuit. In a subsequent step, the noise in the twirled gates is mitigated by sampling error mitigation Pauli operators that are inserted into the twirled quantum circuit. In one embodiment, these error mitigation Pauli operators are combined with the existing twirling gates.

Figure 3:
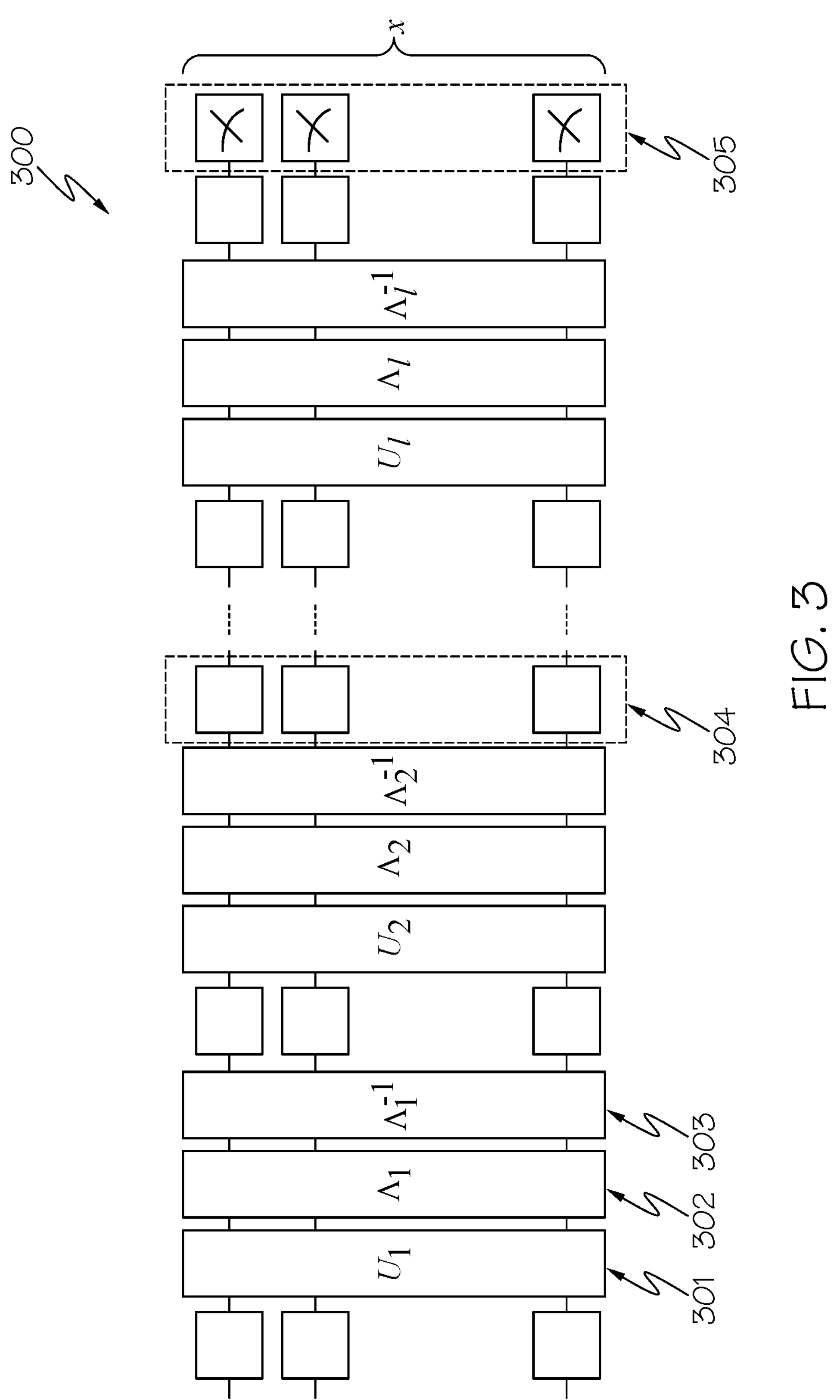
FIG. 3 illustrates a quantum circuit for probabilistic error cancellation in accordance with an embodiment of the present disclosure.

An embodiment of a quantum circuit for implementing a quantum error mitigation technique, such as the PEC quantum error mitigation technique, to generate samples is illustrated in FIG. 3.

Referring to FIG. 3, FIG. 3 illustrates a quantum circuit for probabilistic error cancellation (PEC) in accordance with an embodiment of the present disclosure.

As shown in FIG. 3, quantum circuit 300 includes an ideal layer 301 of quantum gates, a noise channel 302 associated with the ideal layer 301 of quantum gates that the PEC quantum error mitigation technique should mitigate.

Furthermore, as illustrated in FIG. 3, an inverse of noise channel 302 is implemented (see element 303) by randomly sampling noise cancellation Pauli operators based on the learnt noise model.

Quantum circuit 300 further includes a layer 304 of single qubit gates that are used to twirl layer 301 of the quantum gates with their noise channel 302. In one embodiment, the noise cancellation Pauli operators are merged into the single qubit gates of layer 304.

Furthermore, quantum circuit 300 includes a layer 305 for the final measurements that produce the samples x that are used to evaluate the cost function $f(x)$.

In one embodiment, PEC quantum circuit 300 consists of multiple layers of noisy gates (e.g., 1, 2, . . . , l layers, where l is a positive integer number) that are twirled and then error mitigated.

In one embodiment, generator engine 201 implements a quantum error mitigation technique, such as the PEC quantum error mitigation technique, to generate samples of a resulting probability distribution from random quantum circuits using various software tools, which can include, but are not limited to, Qiskit®, Mitiq, Cirq®, PyQuil®, ProjectQ®, etc.

A discussion regarding the basis for implementing a quantum error mitigation technique to generate samples of a resulting probability distribution from random quantum circuits is discussed below.

Currently, the PEC quantum error mitigation technique reweights the different samples $x_i$ (or $f(x_i)$) with signs $s_i$ and then $\gamma$ to obtain an unbiased estimator. For example, the formula to construct expectation values via the PEC quantum error mitigation technique is:

$$\langle H\rangle = \gamma\sum_i p_i s_i f(x_i) \quad \text{(EQ 1)}$$

where $p_i$ is the probability to have sampled $x_i$.

However, in embodiments of the present disclosure, the signs $s_i$ and $\gamma$ are ignored, and instead, the PEC samples $x_i(f(x_i))$ are obtained directly without weighting as shown below in Equation 2 (EQ 2), which is Equation 1 (EQ1) rewritten by ignoring $s_i$ and $\gamma$.

$$\langle \tilde{H}\rangle = \sum_i p_i f(x_i) \quad \text{(EQ 2)}$$

Equation 2 (EQ 2) corresponds to the expectation value of the mixed state determined by the PEC protocol without re-weighting the results. Hence, in one embodiment, these samples are combined to an expectation value as shown in Equation 2 (EQ 2).

In one embodiment, a variant of the PEC quantum error mitigation technique is utilized for quantum optimization algorithms, such as variational quantum optimization algorithms. In one embodiment, optimization of the parameters of the variational quantum optimization algorithm is performed using the quantum error mitigation technique acting on an expectation value or on the samples.

In one embodiment, generator engine 201 reduces the sampling overhead from $\gamma^2$ (for the standard PEC quantum error mitigation technique) to $\gamma$. In particular, generator engine 201 achieves a cubic speed-up over the standard PEC quantum error mitigation technique while also generating optimal samples of the resulting probability distribution as discussed below in connection with Theorem 1, which implies that for a given state that should output states of interest with probability $p_x$ in the noise-free case, the error mitigated protocol will return states of interest with the probability of at least $p_x/\gamma$.

Theorem 1. Suppose a n-qubit state $|\psi\rangle=U|0\rangle$, where U is some unitary with the following:

$$\langle x|\psi\rangle\langle\psi|x\rangle = p_x \geq 0, \quad \text{(EQ 3)}$$

for a computational basis state $|x\rangle$, $x\in\{0, 1\}^n$.

Furthermore, suppose that U can be error mitigated on a noisy device by using PEC with a corresponding $\gamma\geq 1$. Then, the probability of measuring $|x\rangle$ on the noisy devices when running the PEC protocol is lower bounded by $p_x/\gamma$.

The proof of Theorem 1 is shown below. Consider the following quasiprobability decomposition $$\mathcal{U}(\cdot) = \sum_{i=1}^{M}\alpha_i\mathcal{E}_i(\cdot). \quad \text{(EQ 4)}$$

where $u(X)=UXU^\dagger$ and $\varepsilon_i$ denote noisy operations a hardware can perform. Using Equation 4 (EQ 4), the following can be written:

$$p_x = \langle x|\psi\rangle\langle\psi|x\rangle = \sum_{i=1}^{M}\alpha_i\langle x|\mathcal{E}_i(|0\rangle\langle 0|)|x\rangle. \quad \text{(EQ 5)}$$

By defining $\gamma=\|a\|1$, $p_i=|a_i|/\gamma$, and $s_i=\text{sign}(a_i)$, Equation 5 (EQ 5) can be rewritten as the following:

$$p_x = \gamma\sum_{i=1}^{M}p_i s_i\langle x|\mathcal{E}_i(|0\rangle\langle 0|)|x\rangle. \quad \text{(EQ 6)}$$

Furthermore, $s_i\langle x|\varepsilon_i(|0\rangle\langle 0|)|x\rangle$ allows one to define a random variable $Y_i\in\{-1, 0, +1\}$ that equals $\pm 1$ if $|x\rangle$ is measured, where the sign is determined by $s_i$, and 0, otherwise, which satisfies $E[Y_i]=s_i\langle x|\varepsilon_i(|0\rangle\langle 0|)|x\rangle$. The probabilities of $Y_i$ are denoted, taking the values −1, 0, +1 by $$q_i^{-1}, q_i^0, q_i^{+1} \geq 0,$$

respectively. It is noted that by construction, only one of $$q_i^{-1}, q_i^{+1}$$

can be larger than zero.

In addition, suppose a random variable $I\in\{1, \ldots, M\}$ is defined through the probabilities $p_i$. Then, by the law of total expectation, the following is derived:

$$|\gamma\mathbb{E}[Y_I] = \gamma\left(\sum_i \mathbb{E}[Y_i \mid i]P(i)\right) \quad \text{(EQ 7)}$$

$$= \gamma\sum_{i=1}^{M} p_i s_i \langle x|\mathcal{E}_i(|0\rangle\langle 0|)|x\rangle \quad \text{(EQ 8)}$$

$$= p_x. \quad \text{(EQ 9)}$$

These equations can be rewritten as the following:

$$\sum_{i=1}^{M} p_i\left(q_i^{+1} - q_i^{-1}\right) = \frac{p_x}{\gamma}, \quad \text{(EQ 10)}$$

where $$q_i^0$$

can be dropped since it does not contribute to the expectation value. The total probability to measure $|x\rangle$ when applying PEC, independent of the sign of $Y_I$, is then given by $$\sum_{i=1}^{M} p_i\left(q_i^{+1} + q_i^{-1}\right) \geq \frac{p_x}{\gamma}, \quad \text{(EQ 11)}$$

where the lower bound follows immediately from Equation 10 (EQ 10).

Suppose a variational quantum optimization algorithm is implemented with PEC and sampling overhead $\gamma$. Furthermore, suppose the resulting noise-free state $|\psi\rangle$ implies the sampling distribution $p_x$ for computational basis states $|x\rangle$, $x\in\{0, 1\}^n$. From Theorem 1, it is known that sampling $|x\rangle$ in the PEC setting has the probability of at least $p_x/\gamma$. Thus, if one samples $N=K\cdot\gamma$ times, then an average of at least K samples from the noise-free $|\psi\rangle$ is obtained.

The usual formula to construct expectation values via PEC is provided by the following:

$$\langle\psi|H|\psi\rangle = \gamma\sum_{i=1}^{M} p_i s_i f(x_i). \quad \text{(EQ 12)}$$

Since the unbiased estimator of the expectation value is not of interest, the assumptions can be relaxed resulting in the following:

$$Tr[\rho_{PEC}H] = \sum_{i=1}^{M} p_i f(x_i). \quad \text{(EQ 13)}$$

which corresponds to the expectation value of the mixed state $\rho_{PEC}$ defined by the PEC protocol without re-weighting the results.

Classical computer 102 additionally includes a computation engine 202 configured to compute an objective function ($f(x)$) for every generated sample ($|x\rangle$). In one embodiment, computation engine 202 computes $f(x)$ (or $H_x$, since H is assumed to be diagonal).

In one embodiment, computation engine 202 is configured to compute the objective function ($f(x)$) for every generated sample ($|x\rangle$) using the objective function $f(x)$ as given by the problem to be solved. In one embodiment, each sample is a bitstring $x\in\{0, 1\}^n$ and the objective function is a function from $\{0, 1\}^n$ to a real number. Therefore, computation engine 202 computes the objective function $f(x_i)$: $\{0, 1\}^n\rightarrow\mathbb{R}$ for each sampled bitstring $x_i$.

In one embodiment, the upper bound of the expectation value, or the average of the lower and upper bounds of the expectation value, or the full expectation value of the mixed state may be used directly as objective functions for every generated sample ($|x\rangle$) as discussed further below. In one embodiment, the $\langle H\rangle$ is estimated by $$\sum_{i=1}^{N} f(x_i)/N$$

for N samples.

Instead of averaging over all $f(x)$ to estimate $\langle H\rangle$, computation engine 202 computes a conditional value at risk (CVaR) at a particular level of the computed objective functions corresponding to optimal samples in a quantum optimization algorithm, such as a variational quantum optimization algorithm. "Optimal samples," as used herein, refer to samples that have an approximation ratio approximately equal to the value of 1, where the approximation ratio is a ratio between the result obtained by the algorithm and the optimal cost and where the approximation ratio is a number between 0 and 1. A variational quantum optimization algorithm, as used herein, refers to a hybrid quantum-classical optimization algorithm in which an objective function (usually encoded by a parameterized quantum circuit) is evaluated by quantum computation and the parameters of the quantum circuit. Hence, the objective functions are updated using classical optimization methods. In one embodiment, the computation of the CVaR involves computing an average, such as a weighted average, of the computed objective functions at the particular level of the computed objective functions.

In one embodiment, the CVaR is derived by computation engine 202 by taking a weighted average of the "extreme" values in the tail of the distribution of possible objective function values, beyond the value at risk cutoff point.

In one embodiment, computation engine 202 computes a conditional value at risk (CVaR) at a particular level of the computed objective functions corresponding to an optimal sample in a quantum optimization algorithm using various software tools, which can include, but are not limited to, MathWorks®, Tableau®, Qlik Sense®, Sisense®, etc.

In one embodiment, computation engine 202 computes the CVaR at level $\alpha=1/\gamma$. It is noted that other levels are possible too. As a result of computing the CVaR at level $\alpha=1/\gamma$, a sampling overhead of $\gamma$ is introduced since $(1-1/\gamma)$ of the samples are discarded to compute the CVaR.

In one embodiment, the CVaR is used throughout the variational optimization (e.g., Quantum Approximate Optimization Algorithm (QAOA)). In one embodiment, the sampling (e.g., PEC sampling) is used only for the final sampling and combined, such as with ZNE, for the parameter optimization of the variational quantum optimization algorithm.

The rationale for utilizing CVaR is discussed below.

Instead of an expectation value, the CVaR objective function with level $\alpha$ (i.e., the average over the $\alpha$ fraction best sampled solutions) is used. If there was equality in Equation 11 (EQ 11) for all $p_x>0$ and all other possible samples would lead to worse objective values than those x with $p_x>0$, then setting $\alpha=1/\gamma$ would imply that $$CVaR_{1/\gamma}(f(X_{PEC})) = \langle\psi|H|\psi\rangle, \quad \text{(EQ 14)}$$

where $X_{PEC}$ denotes the random variable defined via the PEC protocol. It can be proven that the $\mathrm{CVaR}_{1/\gamma}$ is a lower bound of $\langle\psi|H|\psi\rangle$ as discussed below in connection with Theorem 2.

Theorem 2. Suppose a n-qubit state $|\psi\rangle=U|0\rangle$, where U is some unitary that can be error mitigated on a noisy device by using PEC with a given $\gamma\geq1$. Then, it holds that $$CVaR_{1/\gamma}(f(X_{PEC})) \leq \langle\psi|H|\psi\rangle. \quad \text{(EQ 15)}$$

Suppose the situation outlined above leads to equality of CVaR and the expectation value. Every probability mass that is shifted further to smaller objective values can only reduce the value of the CVaR for fixed $\alpha$, which proves Theorem 2.

Theorem 2 implies that the CVaR with $\alpha=1/\gamma$ is a reasonable approximation of the expectation value in the considered setting. Furthermore, this protocol does not amplify the variance by a factor of $\gamma^2$ as the original protocol does. In contrast, as empirically tested on normal, log-normal, and gamma distributions, the variance, and thus, the sampling overhead, is only amplified by $\gamma^{2/3}$. Thus, by relaxing the requirement of an unbiased estimator and focusing on sampling good solutions, a cubic speed-up over standard PEC can be achieved.

Furthermore, CVaR with $\alpha=1/\gamma$ is only a lower bound of the expectation value. Thus, in practice, one might be able to choose $\alpha>1/\gamma$ and still obtain good results. Thus, the speed-up of using CVaR over standard PEC might be much more than cubic. If CVaR is defined for the right tail instead of the left tail, then an upper bound of $\langle H\rangle$ can be constructed. The upper bound, or the average of the lower and upper bounds, or the full expectation value of the mixed state may be used directly as objective functions in a variational algorithm.

Hence, if one assumes that the PEC sampling probabilities are exactly given by $p_x/\gamma$, then CVaR at level $1/\gamma$ equals exactly the noise-free expectation value $\langle H\rangle$. Thus, focusing on the best $1/\gamma$ fraction of the samples and taking the average provides an approximation to the noise-free expectation value.

A further description of these and other functions is provided below in connection with the discussion of the method for providing optimal samples in quantum optimization algorithms using quantum error mitigation techniques.

Prior to the discussion of the method for generating optimal samples in quantum optimization algorithms using quantum error mitigation techniques, a description of the hardware configuration of classical computer 102 (FIG. 1) is provided below in connection with FIG. 4.

Figure 4:
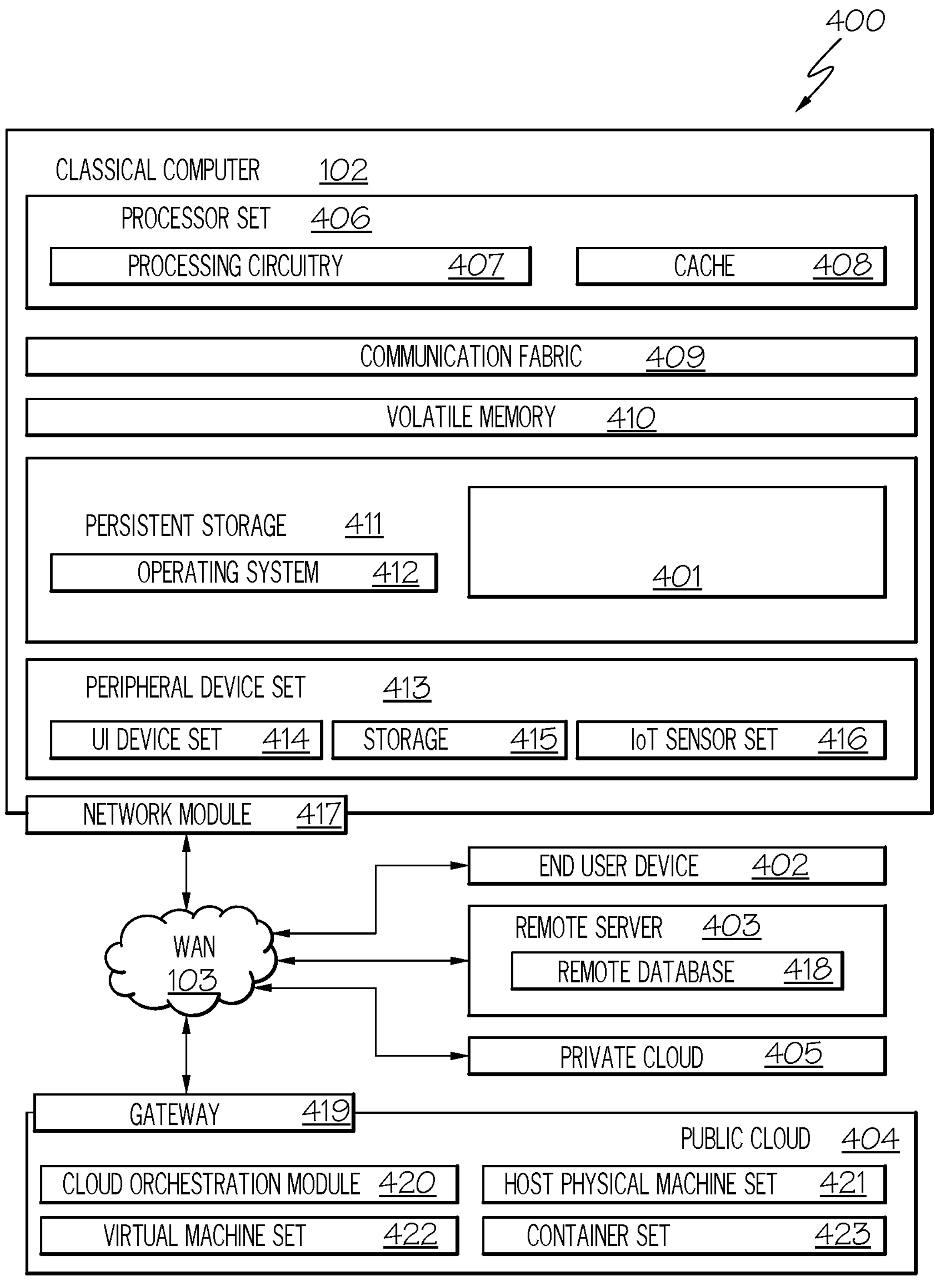
FIG. 4 illustrates an embodiment of the present disclosure of the hardware configuration of the classical computer which is representative of a hardware environment for practicing the present disclosure.

Referring now to FIG. 4, in conjunction with FIG. 1, FIG. 4 illustrates an embodiment of the present disclosure of the hardware configuration of classical computer 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code 401 involved in performing the inventive methods, such as generating optimal samples in quantum optimization algorithms using quantum error mitigation techniques. In addition to block 401, computing environment 400 includes, for example, classical computer 102, network 113, such as a wide area network (WAN), end user device (EUD) 402, remote server 403, public cloud 404, and private cloud 405. In this embodiment, classical computer 102 includes processor set 406 (including processing circuitry 407 and cache 408), communication fabric 409, volatile memory 410, persistent storage 411 (including operating system 412 and block 401, as identified above), peripheral device set 413 (including user interface (UI) device set 414, storage 415, and Internet of Things (IoT) sensor set 416), and network module 417. Remote server 403 includes remote database 418. Public cloud 404 includes gateway 419, cloud orchestration module 420, host physical machine set 421, virtual machine set 422, and container set 423.

Classical computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 418. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically classical computer 102, to keep the presentation as simple as possible. Classical computer 102 may be located in a cloud, even though it is not shown in a cloud in FIG. 4. On the other hand, classical computer 102 is not required to be in a cloud except to any extent as may be affirmatively indicated.

Processor set 406 includes one, or more, computer processors of any type now known or to be developed in the future. Processing circuitry 407 may be distributed over multiple packages, for example, multiple, coordinated integrated circuit chips. Processing circuitry 407 may implement multiple processor threads and/or multiple processor cores. Cache 408 is memory that is located in the processor chip package(s) and is typically used for data or code that should be available for rapid access by the threads or cores running on processor set 406. Cache memories are typically organized into multiple levels depending upon relative proximity to the processing circuitry. Alternatively, some, or all, of the cache for the processor set may be located "off chip." In some computing environments, processor set 406 may be designed for working with qubits and performing quantum computing.

Computer readable program instructions are typically loaded onto classical computer 102 to cause a series of operational steps to be performed by processor set 406 of classical computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 408 and the other storage media discussed below. The program instructions, and associated data, are accessed by processor set 406 to control and direct performance of the inventive methods. In computing environment 400, at least some of the instructions for performing the inventive methods may be stored in block 401 in persistent storage 411.

Communication fabric 409 is the signal conduction paths that allow the various components of classical computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 410 is any type of volatile memory now known or to be developed in the future. Examples include dynamic type random access memory (RAM) or static type RAM. Typically, the volatile memory is characterized by random access, but this is not required unless affirmatively indicated. In classical computer 102, the volatile memory 410 is located in a single package and is internal to classical computer 102, but, alternatively or additionally, the volatile memory may be distributed over multiple packages and/or located externally with respect to classical computer 102.

Persistent Storage 411 is any form of non-volatile storage for computers that is now known or to be developed in the future. The non-volatility of this storage means that the stored data is maintained regardless of whether power is being supplied to classical computer 102 and/or directly to persistent storage 411. Persistent storage 411 may be a read only memory (ROM), but typically at least a portion of the persistent storage allows writing of data, deletion of data and re-writing of data. Some familiar forms of persistent storage include magnetic disks and solid state storage devices. Operating system 412 may take several forms, such as various known proprietary operating systems or open source Portable Operating System Interface type operating systems that employ a kernel. The code included in block 401 typically includes at least some of the computer code involved in performing the inventive methods.

Peripheral device set 413 includes the set of peripheral devices of classical computer 102. Data communication connections between the peripheral devices and the other components of classical computer 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 414 may include components such as a display screen, speaker, microphone, wearable devices (such as goggles and smart watches), keyboard, mouse, printer, touchpad, game controllers, and haptic devices. Storage 415 is external storage, such as an external hard drive, or insertable storage, such as an SD card. Storage 415 may be persistent and/or volatile. In some embodiments, storage 415 may take the form of a quantum computing storage device for storing data in the form of qubits. In embodiments where classical computer 102 is required to have a large amount of storage (for example, where classical computer 102 locally stores and manages a large database) then this storage may be provided by peripheral storage devices designed for storing very large amounts of data, such as a storage area network (SAN) that is shared by multiple, geographically distributed computers. IoT sensor set 416 is made up of sensors that can be used in Internet of Things applications.

For example, one sensor may be a thermometer and another sensor may be a motion detector.

Network module 417 is the collection of computer software, hardware, and firmware that allows classical computer 102 to communicate with other computers through WAN 113. Network module 417 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 417 are performed on the same physical hardware device. In other embodiments (for example, embodiments that utilize software-defined networking (SDN)), the control functions and the forwarding functions of network module 417 are performed on physically separate devices, such that the control functions manage several different network hardware devices. Computer readable program instructions for performing the inventive methods can typically be downloaded to classical computer 102 from an external computer or external storage device through a network adapter card or network interface included in network module 417.

WAN 113 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 402 is any computer system that is used and controlled by an end user (for example, a customer of an enterprise that operates classical computer 102), and may take any of the forms discussed above in connection with classical computer 102. EUD 402 typically receives helpful and useful data from the operations of classical computer 102. For example, in a hypothetical case where classical computer 102 is designed to provide a recommendation to an end user, this recommendation would typically be communicated from network module 417 of classical computer 102 through WAN 113 to EUD 402. In this way, EUD 402 can display, or otherwise present, the recommendation to an end user. In some embodiments, EUD 402 may be a client device, such as thin client, heavy client, mainframe computer, desktop computer and so on.

Remote server 403 is any computer system that serves at least some data and/or functionality to classical computer 102. Remote server 403 may be controlled and used by the same entity that operates classical computer 102. Remote server 403 represents the machine(s) that collect and store helpful and useful data for use by other computers, such as classical computer 102. For example, in a hypothetical case where classical computer 102 is designed and programmed to provide a recommendation based on historical data, then this historical data may be provided to classical computer 102 from remote database 418 of remote server 403.

Public cloud 404 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 404 is performed by the computer hardware and/or software of cloud orchestration module 420. The computing resources provided by public cloud 404 are typically implemented by virtual computing environments that run on various computers making up the computers of host physical machine set 421, which is the universe of physical computers in and/or available to public cloud 404. The virtual computing environments (VCEs) typically take the form of virtual machines from virtual machine set 422 and/or containers from container set 423. It is understood that these VCEs may be stored as images and may be transferred among and between the various physical machine hosts, either as images or after instantiation of the VCE. Cloud orchestration module 420 manages the transfer and storage of images, deploys new instantiations of VCEs and manages active instantiations of VCE deployments. Gateway 419 is the collection of computer software, hardware, and firmware that allows public cloud 404 to communicate through WAN 113.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 405 is similar to public cloud 404, except that the computing resources are only available for use by a single enterprise. While private cloud 405 is depicted as being in communication with WAN 113 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 404 and private cloud 405 are both part of a larger hybrid cloud.

Block 401 further includes the software components discussed above in connection with FIGS. 2-3 to generate optimal samples in quantum optimization algorithms using quantum error mitigation techniques. In one embodiment, such components may be implemented in hardware. The functions discussed above performed by such components are not generic computer functions. As a result, classical computer 102 is a particular machine that is the result of implementing specific, non-generic computer functions.

In one embodiment, the functionality of such software components of classical computer 102, including the functionality for generating optimal samples in quantum optimization algorithms using quantum error mitigation techniques, may be embodied in an application specific integrated circuit.

As stated above, quantum error mitigation refers to a series of techniques aimed at reducing (mitigating) the errors that occur in quantum computing algorithms. Examples of such quantum error mitigation techniques include probabilistic error cancellation (PEC) and zero noise extrapolation (ZNE). PEC is a quantum error mitigation technique in which ideal operations are represented as linear combinations of noisy operations. In PEC, unbiased estimates of expectation values are obtained by averaging over different noisy circuits. ZNE is a quantum error mitigation technique in which an expectation value is computed at different noise levels, and, as a second step, the ideal expectation value is inferred by extrapolating the measured results to the zero-noise limit. Hence, such quantum error mitigation techniques produce unbiased estimations of expectation values. However, the goal of many quantum optimization algorithms (quantum algorithms that are used to solve optimization problems, which are problems of finding the best solution from all feasible solutions) is to find a single sample $|x\rangle$ that has a certain property that can be validated efficiently classically. For example, a sample may correspond to a solution of an optimization problem or an input to a black box function that produces a particular output value. Such quantum optimization algorithms are designed to maximize the probability of identifying such a sample $|x\rangle$. Examples of such quantum optimization algorithms include the Quantum Approximate Optimization Algorithm (QAOA) and Grover's Algorithm. For such quantum optimization algorithms, the goal is to find $\theta^*$ that minimizes $<\psi(\theta)|H|\psi(\theta)>$, and then generate samples $|x\rangle$ from $\psi(\theta)$ that minimize $f(x)$, where $\psi(\theta)$ corresponds to the parametrized state, $f(x)$ corresponds to the objective function and H corresponds to the Hamiltonian (cost function Hamiltonian). Unfortunately, techniques for assisting quantum optimization algorithms to find a single sample $|x\rangle$ that has a certain property that can be validated efficiently classically is limited. For example, error mitigation techniques, such as the quantum error mitigation techniques discussed above, can only be utilized for parameter optimization for quantum optimization algorithms since these quantum error mitigation techniques error mitigate expectation values and not samples. Such quantum error mitigation techniques cannot currently be utilized to generate optimal (best or most favorable) samples $|x\rangle$ in a quantum optimization algorithm.

The embodiments of the present disclosure provide the means for providing optimal samples in quantum optimization algorithms using quantum error mitigation techniques, such as PEC and ZNE, as discussed below in connection with FIG. 5.

Figure 5:
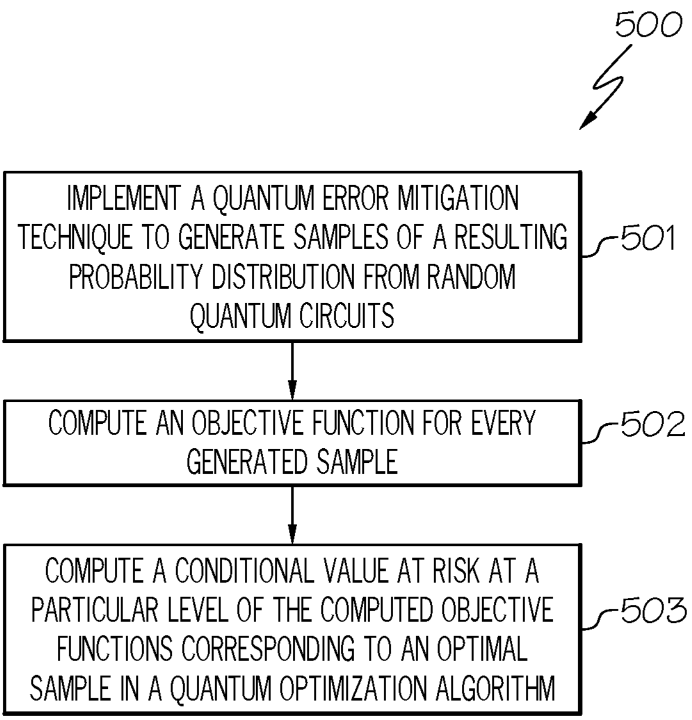
FIG. 5 is a flowchart of a method for generating optimal samples in quantum optimization algorithms using quantum error mitigation techniques in accordance with an embodiment of the present disclosure.

FIG. 5 is a flowchart of a method 500 for generating optimal samples in quantum optimization algorithms using quantum error mitigation techniques in accordance with an embodiment of the present disclosure.

Referring to FIG. 5, in conjunction with FIGS. 1-4, in step 501, generator engine 201 of classical computer 102 implements a quantum error mitigation technique to generate samples of a resulting probability distribution from random quantum circuits.

As discussed above, in one embodiment, such samples correspond to solutions of an optimization problem. In one embodiment, such samples correspond to inputs to a black box function that produce a particular output value.

In one embodiment, the samples are generated from the random quantum circuits in which quantum gates have been inserted to probabilistically cancel errors.

As further discussed above, quantum error mitigation refers to a series of techniques aimed at reducing (mitigating) the errors that occur in quantum computing algorithms. Examples of such quantum error mitigation techniques include probabilistic error cancellation (PEC) and zero noise extrapolation (ZNE). PEC is a quantum error mitigation technique in which ideal operations are represented as linear combinations of noisy operations. In PEC, unbiased estimates of expectation values are obtained by averaging over different noisy circuits. ZNE is a quantum error mitigation technique in which an expectation value is computed at different noise levels, and, as a second step, the ideal expectation value is inferred by extrapolating the measured results to the zero-noise limit.

A random quantum circuit, as used herein, refers to a quantum circuit with randomness in the circuit elements. In one embodiment, such a random quantum circuit includes a subset of noisy gates that are twirled with Pauli operators. The twirling inserts random Pauli operators in the quantum circuit such that the twirled circuit is logically equivalent to the original quantum circuit. The twirling reduces all the noise in the noisy quantum gates to Pauli noise. Furthermore, a noise model is learnt for the twirled gates in the quantum circuit. In a subsequent step, the noise in the twirled gates is mitigated by sampling error mitigation Pauli operators that are inserted into the twirled quantum circuit. In one embodiment, these error mitigation Pauli operators are combined with the existing twirling gates.

An embodiment of a quantum circuit for implementing a quantum error mitigation technique, such as the PEC quantum error mitigation technique, to generate samples is illustrated in FIG. 3.

As shown in FIG. 3, quantum circuit 300 includes an ideal layer 301 of quantum gates, a noise channel 302 associated with the ideal layer 301 of quantum gates that the PEC quantum error mitigation technique should mitigate.

Furthermore, as illustrated in FIG. 3, an inverse of noise channel 302 is implemented (see element 303) by randomly sampling noise cancellation Pauli operators based on the learnt noise model.

Quantum circuit 300 further includes a layer 304 of single qubit gates that are used to twirl layer 301 of the quantum gates with their noise channel 302. In one embodiment, the noise cancellation Pauli operators are merged into the single qubit gates of layer 304.

Furthermore, quantum circuit 300 includes a layer 305 for the final measurements that produce the samples x that are used to evaluate the cost function $f(x)$.

In one embodiment, PEC quantum circuit 300 consists of multiple layers of noisy gates (e.g., 1, 2, . . . , l layers, where l is a positive integer number) that are twirled and then error mitigated.

In one embodiment, generator engine 201 implements a quantum error mitigation technique, such as the PEC quantum error mitigation technique, to generate samples of a resulting probability distribution from random quantum circuits using various software tools, which can include, but are not limited to, Qiskit®, Mitiq, Cirq®, PyQuil®, ProjectQ®, etc.

A discussion regarding the basis for implementing a quantum error mitigation technique to generate samples of a resulting probability distribution from random quantum circuits is discussed below.

Currently, the PEC quantum error mitigation technique reweights the different samples $x_i$ (or $f(x_i)$) with signs $s_i$ and then $\gamma$ to obtain an unbiased estimator. For example, the formula to construct expectation values via the PEC quantum error mitigation technique is:

$$\langle H \rangle = \gamma \sum_i p_i s_i f(x_i) \quad \text{(EQ 1)}$$

where $p_i$ is the probability to have sampled $x_i$.

However, in embodiments of the present disclosure, the signs $s_i$ and $\gamma$ are ignored, and instead, the PEC samples $x_i$ ($f(x_i)$) are obtained directly without weighting as shown below in Equation 2 (EQ 2), which is Equation 1 (EQ1) rewritten by ignoring $s_i$ and $\gamma$.

$$\langle \tilde{H} \rangle = \sum_i p_i f(x_i) \quad \text{(EQ 2)}$$

Equation 2 (EQ 2) corresponds to the expectation value of the mixed state determined by the PEC protocol without re-weighting the results. Hence, in one embodiment, these samples are combined to an expectation value as shown in Equation 2 (EQ 2).

In one embodiment, a variant of the PEC quantum error mitigation technique is utilized for quantum optimization algorithms, such as variational quantum optimization algorithms. In one embodiment, optimization of the parameters of the variational quantum optimization algorithm is performed using the quantum error mitigation technique acting on an expectation value or on the samples.

In one embodiment, generator engine 201 reduces the sampling overhead from $\gamma^2$ (for the standard PEC quantum error mitigation technique) to $\gamma$. In particular, generator engine 201 achieves a quadratic speed-up over the standard PEC quantum error mitigation technique while also generating optimal samples of the resulting probability distribution as discussed herein in connection with Theorem 1, which implies that for a given state that should output states of interest with probability $p_x$ in the noise-free case, the error mitigated protocol will return states of interest with the probability of at least $p_x/\gamma$ as proven above in connection with the discussion of Theorem 1.

Returning to FIG. 5, in conjunction with FIGS. 1-4, in step 502, computation engine 202 of classical computer 102 computes an objective function ($f(x)$) for every generated sample ($|x\rangle$).

As discussed above, in one embodiment, computation engine 202 computes $f(x)$ (or $H_x$, since H is assumed to be diagonal).

In one embodiment, computation engine 202 is configured to compute the objective function ($f(x)$) for every generated sample ($|x\rangle$) the objective function $f(x)$ as given by the problem to be solved. In one embodiment, each sample is a bitstring $x \in \{0, 1\}^n$ and the objective function is a function from $\{0, 1\}^n$ to a real number. Therefore, computation engine 202 computes the objective function $f(x_i)$: $\{0, 1\}^n \rightarrow \mathbb{R}$ for each sampled bitstring $x_i$.

In one embodiment, the upper bound of the expectation value, or the average of the lower and upper bounds of the expectation value, or the full expectation value of the mixed state may be used directly as objective functions for every generated sample ($|x\rangle$). In one embodiment, the $\langle H \rangle$ is estimated by $$\sum_{i=1}^{N} f(x_i)/N$$

for N samples.

In step 503, computation engine 202 of classical computer 102 computes a conditional value at risk (CVaR) at a particular level of the computed objective functions corresponding to an optimal sample in a quantum optimization algorithm, such as a variational quantum optimization algorithm. "Optimal samples," as used herein, refer to samples that have an approximation ratio approximately equal to the value of 1, where the approximation ratio is a ratio between the result obtained by the algorithm and the optimal cost and where the approximation ratio is a number between 0 and 1.

As stated above, a variational quantum optimization algorithm, as used herein, refers to a hybrid quantum-classical optimization algorithm in which an objective function (usually encoded by a parameterized quantum circuit) is evaluated by quantum computation and the parameters of the quantum circuit. Hence, the objective functions are updated using classical optimization methods. In one embodiment, the computation of the CVaR involves computing an average, such as a weighted average, of the computed objective functions at the particular level of the computed objective functions.

In one embodiment, the CVaR is derived by computation engine 202 by taking a weighted average of the "extreme" values in the tail of the distribution of possible objective function values, beyond the value at risk cutoff point.

In one embodiment, computation engine 202 computes a conditional value at risk (CVaR) at a particular level of the computed objective functions corresponding to an optimal sample in a quantum optimization algorithm using various software tools, which can include, but are not limited to, MathWorks®, Tableau®, Qlik Sense®, Sisense®, etc.

In one embodiment, computation engine 202 computes the CVaR at level $\alpha=1/\gamma$. It is noted that other levels are possible too. As a result of computing the CVaR at level $\alpha=1/\gamma$, a sampling overhead of $\gamma$ is introduced since $(1-1/\gamma)$ of the samples are discarded to compute the CVaR.

In one embodiment, the CVaR is used throughout the variational optimization (e.g., Quantum Approximate Optimization Algorithm (QAOA)). In one embodiment, the sampling (e.g., PEC sampling) is used only for the final sampling and combined, such as with ZNE, for the parameter optimization of the variational quantum optimization algorithm.

The rationale for utilizing CVaR is discussed below.

Instead of an expectation value, the CVaR objective function with level $\alpha$ (i.e., the average over the $\alpha$ fraction best sampled solutions) is used. If there was equality in Equation 11 (EQ 11) for all $p_x>0$ and all other possible samples would lead to worse objective values than those x with $p_x>0$, then setting $\alpha=1/\gamma$ would imply that $$CVaR_{1/\gamma}(f(X_{PEC})) = \langle \psi | H | \psi \rangle. \quad \text{(EQ 14)}$$

where $X_{PEC}$ denotes the random variable defined via the PEC protocol. It can be proven that the $CVaR_{1/\gamma}$ is a lower bound of $\langle \psi | H | \psi \rangle$ as discussed herein in connection with Theorem 2.

Furthermore, as discussed above, Theorem 2 implies that the CVaR with $\alpha=1/\gamma$ is a reasonable approximation of the expectation value in the considered setting. Furthermore, this protocol does not amplify the variance by a factor of $\gamma^2$ as the original protocol does. In contrast, as empirically tested on normal, log-normal, and gamma distributions, the variance, and thus, the sampling overhead, is only amplified by $\gamma^{2/3}$. Thus, by relaxing the requirement of an unbiased estimator and focusing on sampling good solutions, a cubic speed-up over standard PEC can be achieved.

Furthermore, CVaR with $\alpha=1/\gamma$ is only a lower bound of the expectation value. Thus, in practice, one might be able to choose $\alpha>1/\gamma$ and still obtain good results. Thus, the speed-up of using CVaR over standard PEC might be much more than cubic. If CVaR is defined for the right tail instead of the left tail, then an upper bound of $\langle H \rangle$ can be constructed. The upper bound, or the average of the lower and upper bounds, or the full expectation value of the mixed state may be used directly as objective functions in a variational algorithm.

Hence, if one assumes that the PEC sampling probabilities are exactly given by $p_x/\gamma$, then CVaR at level $1/\gamma$ equals exactly the noise-free expectation value $\langle H \rangle$. Thus, focusing on the best $1/\gamma$ fraction of the samples and taking the average provides an approximation to the noise-free expectation value.

In this manner, an optimal sample in a quantum optimization algorithm may be generated by using quantum error mitigation techniques.

Furthermore, the principles of the present disclosure improve the technology or technical field involving quantum optimization algorithms.

As discussed above, quantum error mitigation refers to a series of techniques aimed at reducing (mitigating) the errors that occur in quantum computing algorithms. Examples of such quantum error mitigation techniques include probabilistic error cancellation (PEC) and zero noise extrapolation (ZNE). PEC is a quantum error mitigation technique in which ideal operations are represented as linear combinations of noisy operations. In PEC, unbiased estimates of expectation values are obtained by averaging over different noisy circuits. ZNE is a quantum error mitigation technique in which an expectation value is computed at different noise levels, and, as a second step, the ideal expectation value is inferred by extrapolating the measured results to the zero-noise limit. Hence, such quantum error mitigation techniques produce unbiased estimations of expectation values. However, the goal of many quantum optimization algorithms (quantum algorithms that are used to solve optimization problems, which are problems of finding the best solution from all feasible solutions) is to find a single sample $|x\rangle$ that has a certain property that can be validated efficiently classically. For example, a sample may correspond to a solution of an optimization problem or an input to a black box function that produces a particular output value. Such quantum optimization algorithms are designed to maximize the probability of identifying such a sample $|x\rangle$. Examples of such quantum optimization algorithms include the Quantum Approximate Optimization Algorithm (QAOA) and Grover's Algorithm. For such quantum optimization algorithms, the goal is to find $\theta^*$ that minimizes $<\psi(\theta)|H|\psi(\theta)>$, and then generate samples $|x\rangle$ from $\psi(\theta)$ that minimize $f(x)$, where $\psi(\theta)$ corresponds to the parametrized state, $f(x)$ corresponds to the objective function and H corresponds to the Hamiltonian (cost function Hamiltonian). Unfortunately, techniques for assisting quantum optimization algorithms to find a single sample $|x\rangle$ that has a certain property that can be validated efficiently classically is limited. For example, error mitigation techniques, such as the quantum error mitigation techniques discussed above, can only be utilized for parameter optimization for quantum optimization algorithms since these quantum error mitigation techniques error mitigate expectation values and not samples. Such quantum error mitigation techniques cannot currently be utilized to generate optimal (best or most favorable) samples $|x\rangle$ in a quantum optimization algorithm.

Embodiments of the present disclosure improve such technology by generating samples of a resulting probability distribution from random quantum circuits using a quantum error mitigation technique. Examples of such quantum error mitigation techniques include probabilistic error cancellation (PEC) and zero noise extrapolation (ZNE). In one embodiment, such samples correspond to solutions of an optimization problem. In one embodiment, such samples correspond to inputs to a black box function that produce a particular output value. An objective ($f(x)$) for every generated sample ($|x\rangle$) is then computed. A conditional value at risk (CVaR) at a particular level of the computed objective functions corresponding to an optimal sample in a quantum optimization algorithm, such as a variational quantum optimization algorithm, is then computed. A variational quantum optimization algorithm, as used herein, refers to a hybrid quantum-classical optimization algorithm in which an objective function (usually encoded by a parameterized quantum circuit) is evaluated by quantum computation and the parameters of this function are updated using classical optimization methods. In one embodiment, the computation of the CVaR involves computing an average, such as a weighted average, of the computed objective functions at the particular level of the computed objective functions. In this manner, optimal samples in quantum optimization algorithms are generated using quantum error mitigation techniques, such as probabilistic error cancellation and zero noise extrapolation. Furthermore, in this manner, there is an improvement in the technical field involving quantum optimization algorithms.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for generating optimal samples in quantum optimization algorithms, the method comprising:

implementing a quantum error mitigation technique to generate samples of a resulting probability distribution from random quantum circuits, wherein said random quantum circuits are quantum circuits with randomness in circuit elements;

computing an objective function for every generated sample; and computing a conditional value at risk at a particular level of said computed objective functions corresponding to an optimal sample in a quantum optimization algorithm thereby requiring less classical computation for a similar accuracy of quantum computation.

2. The method as recited in claim 1, wherein said computing of said conditional value at risk comprises computing an average of said computed objective functions at said particular level of said computed objective functions.

3. The method as recited in claim 2, wherein said average comprises a weighted average.

4. The method as recited in claim 1, wherein said samples correspond to solutions of an optimization problem.

5. The method as recited in claim 1, wherein said samples correspond to inputs to a black box function that produce a particular output value.

6. The method as recited in claim 1, wherein said quantum optimization algorithm corresponds to a variational quantum optimization algorithm, wherein optimization of parameters of said variational quantum optimization algorithm is performed using said quantum error mitigation technique acting on an expectation value or on said samples.

7. The method as recited in claim 1, wherein said samples are generated from said random quantum circuits in which quantum gates have been inserted to probabilistically cancel errors.

8. A computer program product for generating optimal samples in quantum optimization algorithms, the computer program product comprising one or more computer readable storage mediums having program code embodied therewith, the program code comprising programming instructions for:

implementing a quantum error mitigation technique to generate samples of a resulting probability distribution from random quantum circuits, wherein said random quantum circuits are quantum circuits with randomness in circuit elements;

computing an objective function for every generated sample; and computing a conditional value at risk at a particular level of said computed objective functions corresponding to an optimal sample in a quantum optimization algorithm thereby requiring less classical computation for a similar accuracy of quantum computation.

9. The computer program product as recited in claim 8, wherein said computing of said conditional value at risk comprises computing an average of said computed objective functions at said particular level of said computed objective functions.

10. The computer program product as recited in claim 9, wherein said average comprises a weighted average.

11. The computer program product as recited in claim 8, wherein said samples correspond to solutions of an optimization problem.

12. The computer program product as recited in claim 8, wherein said samples correspond to inputs to a black box function that produce a particular output value.

13. The computer program product as recited in claim 8, wherein said quantum optimization algorithm corresponds to a variational quantum optimization algorithm, wherein optimization of parameters of said variational quantum optimization algorithm is performed using said quantum error mitigation technique acting on an expectation value or on said samples.

14. The computer program product as recited in claim 8, wherein said samples are generated from said random quantum circuits in which quantum gates have been inserted to probabilistically cancel errors.

15. A system, comprising:

a memory for storing a computer program for generating optimal samples in quantum optimization algorithms; and a processor connected to said memory, wherein said processor is configured to execute program instructions of the computer program comprising:

implementing a quantum error mitigation technique to generate samples of a resulting probability distribution from random quantum circuits, wherein said random quantum circuits are quantum circuits with randomness in circuit elements;

computing an objective function for every generated sample; and computing a conditional value at risk at a particular level of said computed objective functions corresponding to an optimal sample in a quantum optimization algorithm thereby requiring less classical computation for a similar accuracy of quantum computation.

16. The system as recited in claim 15, wherein said computing of said conditional value at risk comprises computing an average of said computed objective functions at said particular level of said computed objective functions.

17. The system as recited in claim 16, wherein said average comprises a weighted average.

18. The system as recited in claim 15, wherein said samples correspond to solutions of an optimization problem.

19. The system as recited in claim 15, wherein said samples correspond to inputs to a black box function that produce a particular output value.

20. The system as recited in claim 15, wherein said quantum optimization algorithm corresponds to a variational quantum optimization algorithm, wherein optimization of parameters of said variational quantum optimization algorithm is performed using said quantum error mitigation technique acting on an expectation value or on said samples.

* * * * *